US008031898B2

(12) United States Patent
Akino

(10) Patent No.: US 8,031,898 B2
(45) Date of Patent: Oct. 4, 2011

(54) DYNAMIC MICROPHONE

(75) Inventor: Hiroshi Akino, Machida (JP)

(73) Assignee: Kabushiki Kaisha Audio-Technica, Machida-Shi, Tokyo (JP)

(*) Notice: Subject to any disclaimer, the term of this patent is extended or adjusted under 35 U.S.C. 154(b) by 546 days.

(21) Appl. No.: 12/314,104

(22) Filed: Dec. 4, 2008

(65) Prior Publication Data

US 2009/0154753 A1 Jun. 18, 2009

(30) Foreign Application Priority Data

Dec. 18, 2007 (JP) ................................. 2007-325703

(51) Int. Cl.
*H04R 9/08* (2006.01)
*H04B 15/00* (2006.01)

(52) U.S. Cl. ........ 381/355; 381/177; 381/356; 381/357; 381/358; 381/360; 381/361; 381/369

(58) Field of Classification Search ................. 381/94.1, 381/177, 355, 356, 357, 358, 360, 361, 369
See application file for complete search history.

(56) References Cited

U.S. PATENT DOCUMENTS

| | | | | |
|---|---|---|---|---|
| 2,848,561 | A * | 8/1958 | Gorike | 381/357 |
| 3,459,902 | A * | 8/1969 | Warning | 381/357 |
| 3,995,124 | A * | 11/1976 | Gabr | 381/357 |
| 4,427,845 | A * | 1/1984 | Yoshida | 381/94.9 |
| 6,091,828 | A * | 7/2000 | Akino et al. | 381/355 |

* cited by examiner

*Primary Examiner* — Long Tran
(74) *Attorney, Agent, or Firm* — Manabu Kanesaka

(57) ABSTRACT

There is provided a dynamic microphone in which the output impedance does not increase and also the failure rate does not increase though using a microphone unit and a vibration detecting unit to reduce handling noise. In the dynamic microphone including a microphone unit 20 that includes a first diaphragm 24 and a first magnetic circuit 26 and delivers sound signals and a vibration detecting unit 30 that includes a second diaphragm 32 and a second magnetic circuit 33 and detects vibrations applied to a microphone case, whereby the output signal of the vibration detecting unit 30 being delivered as an opposite phase with respect to the output signal of the microphone unit 20, a field coil 41 excited by the output signal of the vibration detecting unit 30 is provided on the first magnetic circuit 26 side of the microphone unit 20.

2 Claims, 2 Drawing Sheets

DYNAMIC MICROPHONE

CROSS-REFERENCE TO RELATED APPLICATIONS

The present application is based on, and claims priority from, Japanese Application Serial Number JP2007-325703, filed Dec. 18, 2007, the disclosure of which is hereby incorporated by reference herein in its entirety.

TECHNICAL FIELD

The present invention relates to a dynamic microphone, and more particularly, to a dynamic microphone having a function of reducing vibration noise.

BACKGROUND ART

A microphone unit includes a vibrating part having a diaphragm capable of vibrating with respect to a microphone case and a fixed part including a magnetism generating circuit or a backplate supported directly on the microphone case.

Of various types of microphones, a hand-held microphone frequently presents a problem of vibration noise generated, for example, when the microphone case is rubbed with a finger. The vibration noise of this kind is generated by an inertial force such that the effective mass of the vibrating part of microphone unit tends to stay in the original state when vibrations are applied to the microphone case.

Generally, for a microphone provided with a diaphragm having the same area density, vibration noise of a low frequency component increases in the order of non-directional, unidirectional, and bidirectional. Also, comparing with a condenser microphone and a ribbon microphone, a dynamic (electrodynamic) microphone is liable to generate vibration noise because its diaphragm is heavy.

Therefore, for a hand-held unidirectional dynamic microphone especially used for vocals, conventionally, handling noise generated by the rubbing of microphone case with a finger has caused a problem.

As one method for reducing such handling noise, there is available a so-called shock mount method in which vibrations are insulated by using an elastic body such as rubber when the microphone unit is supported on the microphone case (for example, Japanese Patent Application Publication No. H01-197000).

However, the shock mount method has problems described below. The vibration insulating effect of the shock mount method depends on the resonance frequency and resonance sharpness of a vibration system. Therefore, the vibration noise reducing effect can be anticipated only on a frequency band on which frequencies are higher than or equal to the frequency correlated with the resonance frequency. Also, when solid-borne noise is loud, the vibration insulating effect cannot be achieved for the high frequency component thereof.

Accordingly, the applicant of the present invention has proposed a method for canceling handling noise by providing a vibration detecting unit having almost the same configuration as that of the microphone unit in the microphone case and by adding an output signal from the vibration detecting unit to an output signal from the microphone unit as a negative phase (Japanese Patent Application Publication No. H11-196489).

With this method, if vibrations are applied to a microphone case, not shown, whereas, for example, an output signal of positive phase is delivered from a microphone unit 1, an output signal of negative phase is delivered from a vibration detecting unit 2. Therefore, after, for example, the magnetization direction of a permanent magnet has been reversed or the winding method of a voice coil has been reversed, the microphone unit 1 and the vibration detecting unit 2 are connected to each other in series as shown in FIG. 3. Thereby, handling noise can be reduced satisfactorily over a relatively wide frequency range.

However, since the microphone unit and the vibration detecting unit are connected to each other in series, if the impedance of each unit is the same, the output impedance of microphone doubles.

As the output impedance of microphone decreases, the noise caused by electrostatic coupling or magnetic coupling from the outside is more difficult to be brought in. Therefore, the rise in output impedance of microphone is unfavorable in this respect.

Also, a main cause for failure of dynamic microphone is wire breaking. Wire breaking takes place mainly at a soldering location in the end part of voice coil. In the case where the voice coils of the microphone unit and the vibration detecting unit are connected to each other in series, if the wire breaks even at only one place, no sound is produced, so that the failure rate doubles as compared with the ordinary dynamic microphone having no vibration detecting unit.

Accordingly, an object of the present invention is to provide a dynamic microphone in which the output impedance does not increase and also the failure rate does not increase while handling noise is reduced by using a microphone unit and a vibration detecting unit.

SUMMARY OF THE INVENTION

To achieve the above object, the present invention provides a dynamic microphone including a microphone unit, a microphone case, and a vibration detecting unit, the microphone unit including a first magnetism generating circuit and a first diaphragm, the first magnetism generating circuit having a first magnetic gap formed by a first permanent magnet, and the first diaphragm having a first voice coil arranged in the first magnetic gap;

the microphone case supporting the microphone unit on one end side thereof and being provided with a back air chamber having a predetermined volume communicating with the back surface side of the first diaphragm therein; and the vibration detecting unit being arranged in the back air chamber in a state in which a second magnetism generating circuit and a second diaphragm are provided, the second magnetism generating circuit having a second magnetic gap formed by a second permanent magnet, and the second diaphragm having a second voice coil arranged in the second magnetic gap, whereby the output signal of the vibration detecting unit being delivered as an opposite phase with respect to the output signal of the microphone unit, wherein a field coil excited by the output signal of the second voice coil is provided on the first magnetism generating circuit side.

As a preferred mode, the field coil is arranged around the first permanent coil.

According to this dynamic microphone, the voice coils of the microphone unit and the vibration detecting unit are not connected to each other directly in series, but are connected to each other magnetically via the field coil. Therefore, the output impedance of the microphone itself does not rise, and also even if wire breaking takes place on the vibration detecting unit side, the sound output does not cease unless wire breaking takes place on the microphone unit side.

DETAILED DESCRIPTION

Figure 1:
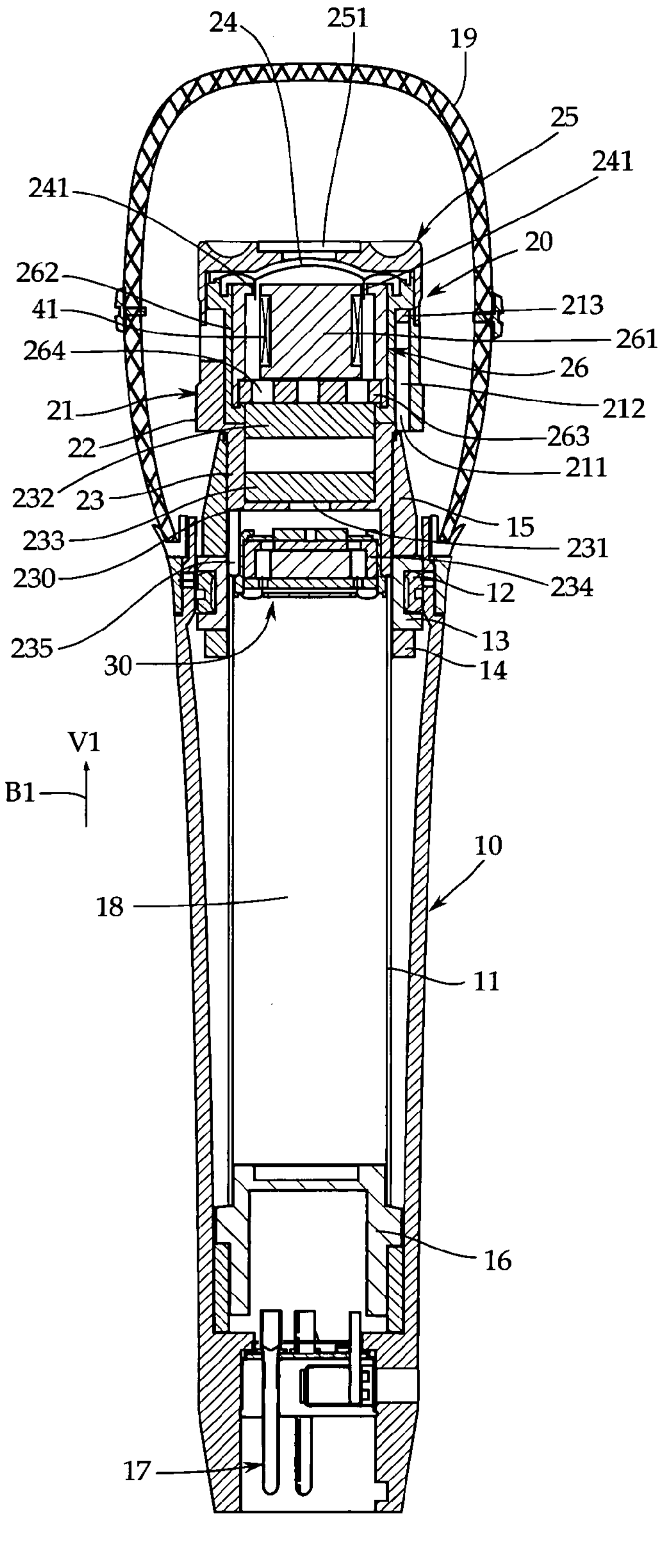
FIG. 1 is a sectional view showing a general configuration of a unidirectional dynamic microphone in accordance with an embodiment of the present invention.

An embodiment of the present invention will now be described with reference to FIGS. 1 and 2. FIG. 1 is a sectional view showing a general configuration of a unidirectional dynamic microphone in accordance with the embodiment of the present invention, and FIG. 2 is an enlarged sectional view of an essential portion of the dynamic microphone.

Figure 2:
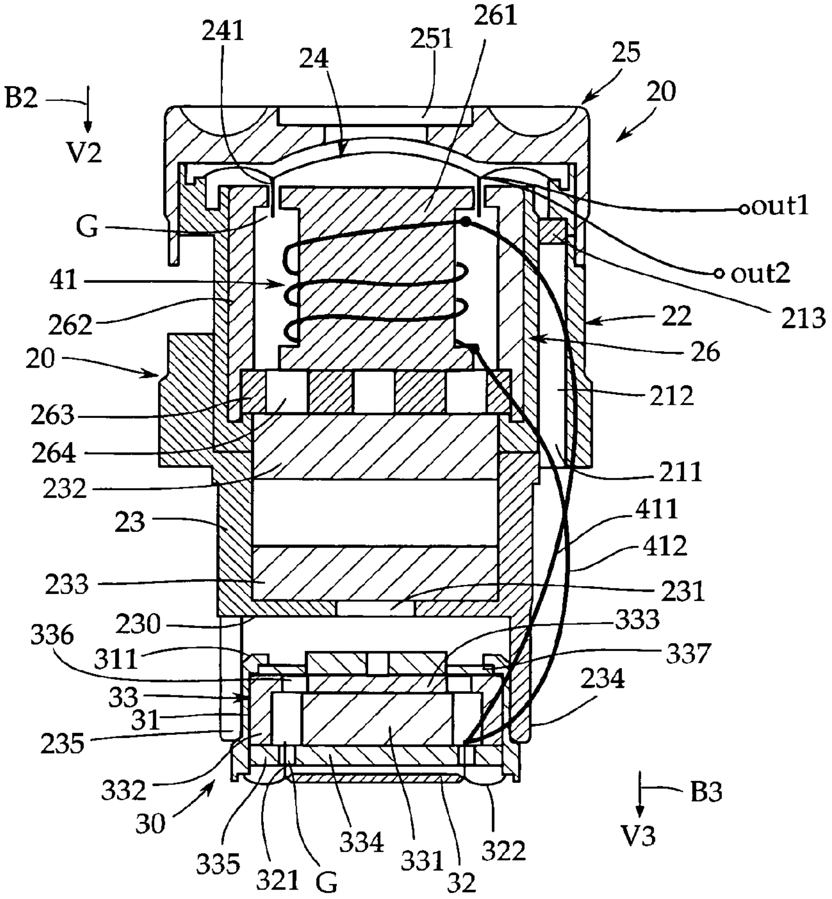
FIG. 2 is an enlarged sectional view of an essential portion of the dynamic microphone shown in FIG. 1.
Figure 3:
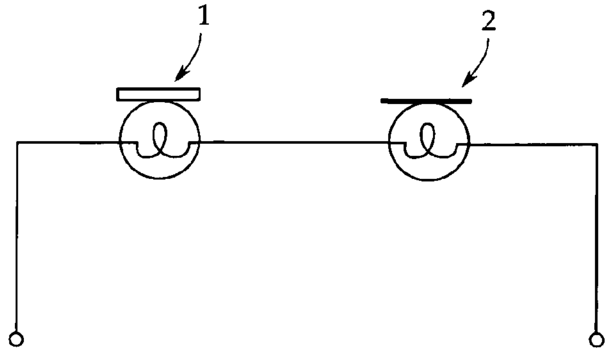
FIG. 3 RELATED ART
FIG. 3 is a schematic view showing a state in which a microphone unit and a vibration detecting unit are connected to each other in a conventional example.

As shown in FIGS. 1 and 2, this dynamic microphone includes a cylindrical microphone case 10 formed of a metal such as aluminum. In the microphone case 10, a cylindrical inner cylinder 11 is held coaxially via a shock mount 12.

The shock mount 12 is formed of, for example, a rubber elastic body, and on the inner peripheral surface side thereof, a holding ring 13 for the inner cylinder 11 is provided. In FIG. 1, at a position on the lower edge side of the shock mount 12 of the inner cylinder 11, a stopper ring 14 is installed. At a position on the upper edge side of the shock mount 12 of the inner cylinder 11, a reinforcing ring 15 is fitted.

At one end (the upper end in FIG. 1) of the inner cylinder 11, a microphone unit 20 for receiving sound waves is installed. The other end of the inner cylinder 11 is closed by a bottomed cylinder-shaped spacer cylinder 16. Therefore, the interior of the inner cylinder 11 serves as an air chamber (acoustic volume) 18 having a predetermined volume, which communicates with the microphone unit 20.

The other end of the inner cylinder 11 is supported on the lower end side of the microphone case 10 via the spacer cylinder 16. On the lower end side of the microphone case 10, an output connector 17 is provided. At the upper end of the microphone case 10, a wind screen 19 for covering the microphone unit 20 is provided.

The microphone unit 20 is provided with a cylindrical unit case 21. In this embodiment, the unit case 21 has a large-diameter main cylindrical part 22 and a small-diameter subsidiary cylindrical part 23 connectingly provided under the main cylindrical part 22, and a diaphragm (first diaphragm) 24 having a voice coil 241 is provided in the opening part of the main cylindrical part 22. Also, in the opening part of the main cylindrical part 22, a resonator 25 having a front acoustic terminal 251 is installed so as to cover the diaphragm 24.

In the main cylindrical part 22, a magnetic circuit (first magnetic circuit) 26 is provided. The magnetic circuit 26 includes a columnar magnet 261 magnetized in the up and down direction in FIG. 1, a cylindrical side yoke 262 arranged concentrically around the magnet 261, and a tail yoke 263 that connects the side yoke 262 to one pole of the magnet 261. A magnetic gap G is formed between the magnet 261 and the side yoke 262, and the voice coil 241 of the diaphragm 24 is arranged in this magnetic gap G.

In a level difference part between the main cylindrical part 22 and the subsidiary cylindrical part 23, a rear acoustic terminal 211 is provided. The rear acoustic terminal 211 communicates with a space on the back surface side of the diaphragm 24 through an air passage 212 formed in the main cylindrical part 22. In the air passage 212, a predetermined acoustic resistance material 213 is provided.

The subsidiary cylindrical part 23 communicates with the interior of the main cylindrical part 22, that is, the space on the back surface side of the diaphragm 24 via air holes 264 formed in the tail yoke 263. Also, in a bottom part 230 of the subsidiary cylindrical part 23, an air hole 231 communicating with the air chamber 18 in the microphone case 10 is formed. On the tail yoke 263 side and on the bottom part 230 side in the subsidiary cylindrical part 23, acoustic resistance materials 232 and 233 are provided, respectively.

The subsidiary cylindrical part 23 is fittedly supported on one end side of the inner cylinder 11. On the bottom part 230 side of the subsidiary cylindrical part 23, a sleeve 234 is connectingly provided, and a vibration detecting unit 30 is attached to the sleeve 234.

In this embodiment, the vibration detecting unit 30 is provided with a unit case 31 fittedly held in the sleeve 234. In this case, the unit case 31 is fittedly held in the sleeve 234 so that a bottom part 311 of the unit case 31 faces to the bottom part 230 of the subsidiary cylindrical part 23. Therefore, the opening part of the unit case 31 is directed downward in FIGS. 1 and 2.

In the opening part of the unit case 31, a diaphragm (second diaphragm) 32 having a voice coil 321 is vibratably provided via a corrugation 322 formed of a plastic sheet. In this case, as the diaphragm 32, for example, a brass sheet having a thickness of 0.8 mm and a diameter of about 10 mm is used. Thereby, the signal output caused by vibrations is secured, and a change in pressure in the air chamber 18 is produced surely.

In the unit case 31, a magnetic circuit (second magnetic circuit) 33 is housed. Like the magnetic circuit 26 of the microphone unit 20, the magnetic circuit 33 includes a columnar magnet 331 magnetized in the up and down direction, a cylindrical side yoke 332 arranged concentrically around the magnet 331, and a tail yoke 333 that connects the side yoke 332 to one pole of the magnet 331.

In this case, on the magnet 331, an annularly-shaped center pole piece 334 is provided, and on the side yoke 332 side as well, a ring yoke 335 is provided so as to face to the center pole piece 334, thereby forming a gap G between the center pole piece 334 and the ring yoke 335. In this gap G, a voice coil 321 of the diaphragm 32 is arranged.

The tail yoke 333 is formed with a plurality of air holes 336, and an acoustic resistance material 337 is provided in each of the air holes 336. Also, in a part of the sleeve 234, for example, a slit-shaped opening 235 is formed.

The vibration detecting unit 30 is housed in the air chamber 18 of the inner cylinder 11 in a state of being fittedly held in the sleeve 234, and the air chamber 18 communicates with the space on the back surface side of the diaphragm 24 via an air passage including the opening 235 of the sleeve 234, the air hole 231 of the subsidiary cylindrical part 23, and the air holes 264 of the tail yoke 263.

According to the above-described configuration, if the microphone case 10 is driven, for example, at a vibration speed of V1 in the direction indicated by an upward arrow mark B1 in FIG. 1, the diaphragm 24 of the microphone unit 20 relatively vibrates at a vibration speed of V2 in the direction indicated by a downward arrow mark B2 in FIG. 2, and also the diaphragm 32 of the vibration detecting unit 30 relatively vibrates likewise at a vibration speed of V3 in the direction indicated by a downward arrow mark B3 in FIG. 2.

That is to say, when the microphone case 10 is displaced upward, relatively, both of the diaphragm 24 of the microphone unit 20 and the diaphragm 32 of the vibration detecting unit 30 are displaced downward.

By this downward displacement of the diaphragm 32, the pressure in the air chamber 18 is raised, and is applied to the back surface of the diaphragm 24 of the microphone unit 20 through the air passage so as to push back the diaphragm 24 downward.

In contrast, when the microphone case 10 is displaced in the reverse direction, that is, in the downward direction, relatively, both of the diaphragm 24 of the microphone unit 20 and the diaphragm 32 of the vibration detecting unit 30 are displaced upward.

By this upward displacement of the diaphragm 32, the pressure in the air chamber 18 is lowered, and is applied to the back surface of the diaphragm 24 of the microphone unit 20 through the air passage so as to allow the diaphragm 24 that tends to be displaced upward to stay at the original position.

Thus, the vibrations of the diaphragm 24 of the microphone unit 20 are restrained mechanically, and thereby the vibration noise is reduced. Sound waves go to the back surface side of the diaphragm 24 through the rear acoustic terminal 211 of the microphone unit 20, and are absorbed or significantly damped by the acoustic resistance materials 232 and 233 in the subsidiary cylindrical part 23. Therefore, the sound waves are not picked up by the vibration detecting unit 30.

Regarding the sound output, as shown in FIG. 2, both ends (the winding start end and the winding finish end) of the voice coil 241 of the microphone unit 20 are connected to output terminals OUT1 and OUT2 on the hot side and the cold side, and sound signals are taken out of the output terminals OUT1 and OUT2.

To reduce a vibration noise signal included in the sound signal, in the present invention, a field coil 41 is provided around the magnet 261 of the microphone unit 20, and both ends (the winding start end and the winding finish end) of the voice coil 321 of the vibration detecting unit 30 are connected to the field coil 41 via lead wires 411 and 412. In this case, the output signal of the microphone unit 20 and the output signal of the vibration detecting unit 30 are in antiphase.

As described above, since both of the diaphragm 24 of the microphone unit 20 and the diaphragm 32 of the vibration detecting unit 30 tend to be displaced in the same direction by external vibrations, for example, the magnetization directions of the magnets 261 and 331 are reversed, or the winding directions of the voice coils 241 and 321 are reversed, by which both the output signals can be made in antiphase.

Thus, by exciting the field coil 41 by means of a voltage in antiphase with the microphone unit 20 generated by the vibration detecting unit 30, the vibration noise signal included in the sound signal of the microphone unit 20 and the vibration noise signal produced by the vibration detecting unit 30 are offset in terms of alternating current, so that the vibration noise can be reduced electrically.

Thus, in the present invention, the output of the vibration detecting unit 30 is magnetically coupled with the magnetic circuit 26 of the microphone unit 20 via the field coil 41 like a transformer. Since the voice coil that is operated by the ordinary sound is used for the microphone unit 20 only, the output impedance of the microphone itself does not become high.

Also, since the voice coils of the microphone unit 20 and the vibration detecting unit 30 are not connected to each other directly in series, the rate of failure caused by wire breaking decreases.

In the above-described embodiment, as a preferred mode, the pneumatic pressure produced by the diaphragm 32 of the vibration detecting unit 30 is applied to the back surface of the diaphragm 24 of the microphone unit 20. In some cases, however, the vibration detecting unit 30 may be arranged in a closed space.

The invention claimed is:

1. A dynamic microphone comprising a microphone unit, a microphone case, and a vibration detecting unit, the microphone unit comprising a first magnetism generating circuit and a first diaphragm, the first magnetism generating circuit having a first magnetic gap formed by a first permanent magnet, and the first diaphragm having a first voice coil arranged in the first magnetic gap;

the microphone case supporting the microphone unit on one end side thereof and being provided with a back air chamber having a predetermined volume communicating with the back surface side of the first diaphragm therein; and the vibration detecting unit being arranged in the back air chamber in a state in which a second magnetism generating circuit and a second diaphragm are provided, the second magnetism generating circuit having a second magnetic gap formed by a second permanent magnet, and the second diaphragm having a second voice coil arranged in the second magnetic gap, whereby the output signal of the vibration detecting unit being delivered as an opposite phase with respect to the output signal of the microphone unit, wherein a field coil excited by the output signal of the second voice coil is provided on the first magnetism generating circuit side.

2. The dynamic microphone according to claim 1, wherein the field coil is arranged around the first permanent coil.

* * * * *